(12) United States Patent
LaBrush

(10) Patent No.: US 6,747,379 B2
(45) Date of Patent: Jun. 8, 2004

(54) DYNAMOELECTRIC MACHINE WITH REDUCED VIBRATION

(76) Inventor: Edward Clarence LaBrush, 38801 Dodd's Landing, Willoughby Hills, OH (US) 44094

( * ) Notice: Subject to any disclaimer, the term of this patent is extended or adjusted under 35 U.S.C. 154(b) by 0 days.

(21) Appl. No.: 10/303,853

(22) Filed: Nov. 26, 2002

(65) Prior Publication Data

US 2004/0021392 A1 Feb. 5, 2004

Related U.S. Application Data

(60) Provisional application No. 60/363,238, filed on Mar. 11, 2002.

(51) Int. Cl.[7] ................................................. H02K 5/24
(52) U.S. Cl. ......................................... 310/51; 310/259
(58) Field of Search ............................ 310/51, 254, 259

(56) References Cited

U.S. PATENT DOCUMENTS

| | | | | |
|---|---|---|---|---|
| 5,235,227 A | * | 8/1993 | Fazekas | 310/51 |
| 6,160,331 A | * | 12/2000 | Morreale | 310/51 |
| 6,191,510 B1 | * | 2/2001 | Landin et al. | 310/51 |
| 6,499,209 B1 | * | 12/2002 | Landin et al. | 29/596 |
| 2001/0030486 A1 | * | 10/2001 | Pijanowski | 310/254 |

* cited by examiner

Primary Examiner—Thanh Lam
(74) Attorney, Agent, or Firm—John F. McDevitt

(57) ABSTRACT

A method and structural means are provided to mechanically modify the electromagnetic structure of a dynamoelectric machine for suppression of the vibration and noise otherwise occurring during machine operation. In doing so, the electrical performance of said modified dynamoelectric machine need not be significantly degraded.

62 Claims, 3 Drawing Sheets

DYNAMOELECTRIC MACHINE WITH REDUCED VIBRATION

RELATED PROVISIONAL APPLICATION

This application relates to Provisional Application Serial No. 60/363,238 filed by the present applicant on Mar. 11, 2002.

BACKGROUND OF THE INVENTION

The present invention relates generally to dynamoelectric machines having stator and rotor components and more specifically to a particular construction for said dynamoelectric machines made in order to reduce vibration and noise during machine operation.

A wide variety of dynamoelectric machines having stator and rotor components are already known including machines having rotation or linear motion occurring between said components during operation of a particular machine. Known rotating dynamoelectric machines include both electric motors and electric generators. A wide variety of rotating electric motors is also known, including motors having an outer stator housing with an inner rotating rotor, an inverted motor wherein the stator is positioned within the bore of an outer rotating rotor and the electric motor component for an adjustable speed drive system. In known linear or non-rotating dynamoelectric machines, the rotor or translator component moves in a linear direction with respect to the stator component employed in said machine. The present invention provides a novel means applicable to all said type dynamoelectric machines for reducing the vibration and noise otherwise being encountered during machine operation. More particularly, a novel method and means to modify the structural features of the electromagnetic structure in said dynamoelectric machines is provided according to the present invention which is found to reduce operating vibration and noise. As used herein, the term "electromagnetic structure" is defined as the laminations and the electrical conductors of the stator component including all associated devices and materials attached to said stator component construction.

In U.S. Pat. No. 5,861,699 a stator core for an electric machine, such as an electric motor, is described having axial variations in the radial dimensions of the laminations by rotating said laminations with respect to each other for reduced noise. It is further stated therein that such noise attenuation is attributable to such uneven stator lamination construction. There is further disclosed in U.S. Pat. No. 6,191,510 structural means to internally damp the stator component of an electric motor for reduced vibration by inserting viscoelastic damping material between the stator laminations. There still remains need to further reduce the vibration and noise being experienced when operating a dynamoelectric machine. without significantly degrading its electrical performance.

SUMMARY OF THE INVENTION

The present provides a method and means for structurally modifying the electromagnetic structure in a dynamoelectric machine after already having been designed for optimum electrical performance. In doing so according to the present invention, resonant vibration and noise can be diminished without significantly degrading the electrical performance. The first step in the present method of reducing vibration and noise is to disorient the maximum receptances of the electromagnetic structure at natural frequencies with respect to the applied magnetic forces at the same frequencies in order to reduce the overall receptance in said structure and thereby reduce its overall response. The term "receptance" in said electromagnetic structure is understood to be the ratio of physical displacement response with respect to the applied magnetic force. The term "response" is understood to be the physical elastic displacement in said electromagnetic structure which can be perceived as vibration and/or noise. The mechanical features of said electromagnetic structure are modified in accordance with such evaluation to reduce any close coincidence between the overall receptance of said modified electromagnetic structure and said applied magnetic force. The remaining step in the present method is the utilization of sites in the electromagnetic structure for damping to further attenuate a diminished vibration response. The principle of "slip potential" is employed as a means for creating sites for slip damping to attenuate undesired resonant amplification of the vibration. In accordance with said latter procedure, adjacent stator laminations in said electromagnetic structure are modified to provide slip damping therebetween due to having dissimilar receptance.

DETAILED DESCRIPTION OF THE INVENTION

Figure 1:
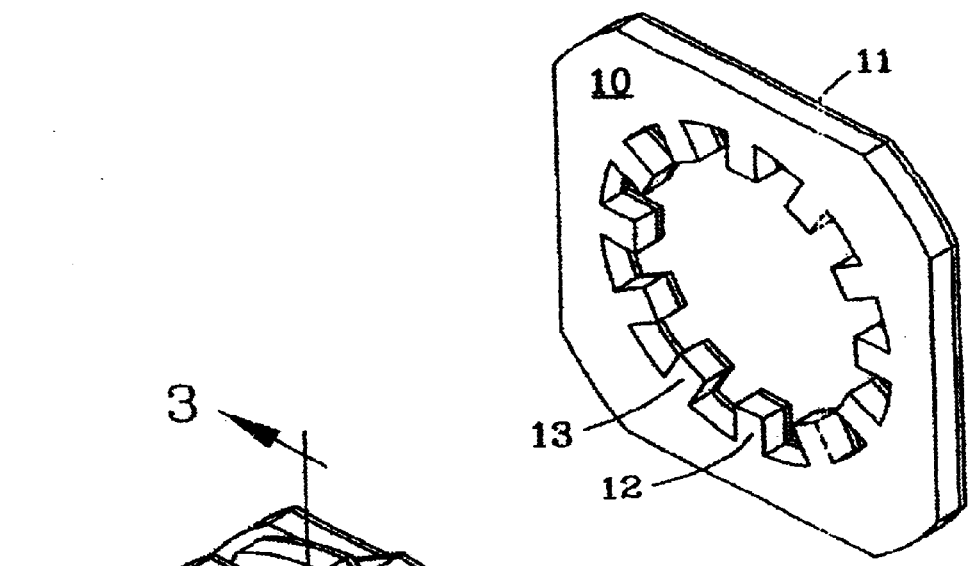
FIG. 1 illustrates a representative steel stator lamination with non-uniform radial receptance at the teeth.

The magnetic forces in an operating dynamoelectric machine may contain frequency components that closely correspond to natural frequencies of the electromagnetic structure being employed in said dynamoelectric machine. The usual consequence of this near coincidence of the frequencies is amplification of the vibration of the electromagnetic structure due to resonance.

Natural frequencies and corresponding mode shapes of an electromagnetic structure can be calculated as well as measured for an existing structure. The spatial distribution of the magnetic forces acting on the existing electromagnetic structure can also be calculated or measured. The corresponding magnetic force frequency spectra can be calculated from a measured or calculated time history of the magnetic forces acting at points on said electromagnetic structure.

The amount of amplified vibration for said electromagnetic structure depends on the spatial distribution of the magnetic force and the closeness of coincidence of the force frequency and the natural frequency. The electromagnetic structure has a characteristic called receptance. It is an indication of the level of vibratory response at a particular point of the structure at a natural frequency to a magnetic force applied at that natural frequency. The maximum vibration of the electromagnetic structure occurs when the frequency of the magnetic force coincides with a natural frequency of the electromagnetic structure and the position of the force coincides with a position of maximum receptance of the electromagnetic structure at that natural frequency.

The receptance field of an electromagnetic structure at a natural frequency corresponds to the mode shape of the structure at that natural frequency. A mode shape is a graphical representation of relative amplitudes of vibration of the structure at a particular natural frequency. The regions of greatest receptance at a natural frequency are the regions of the electromagnetic structure near the antinodes of the corresponding mode shape. The antinodes are the locations of maximum relative vibration at that natural frequency. Regions of least receptance at a natural frequency are the regions of the electromagnetic structure near the nodes of the corresponding mode shape. The nodes of the mode shape are the regions of zero relative amplitude at that natural frequency.

The amplified vibration of an electromagnetic structure is large when the frequency of the applied magnetic force is equal to the natural frequency of the electromagnetic structure and the position of the magnetic force is at an antinode (maximum receptance) of the electromagnetic structure at that natural frequency. Conversely, the amplified vibration of an electromagnetic structure is small when the frequency of the applied magnetic force is equal to a natural frequency of the electromagnetic structure and the position of the magnetic force is at a node (minimum receptance) of the electromagnetic structure at that natural frequency.

In dynamoelectric machines the magnetic force at a particular frequency is distributed over the electromagnetic structure. The receptance field of the electromagnetic structure at that particular frequency may have regions that are in-phase with the applied force and other regions that are out-of-phase with the applied force. The result is that such forces tend to null one another, thereby reducing vibration.

The acoustic noise produced by the vibration of an electromagnetic structure in response to magnetic forces is called magnetic noise. Measures taken to reduce the vibration also reduce the magnetic noise.

It is generally desirable to avoid resonant amplification due to near coincidence between a frequency component of the applied magnetic force and a natural frequency of the electromagnetic structure. There are two classifications of machines where it is often difficult to avoid near coincidence of the frequencies. Machines of the first kind have magnetic forces with many frequency components acting simultaneously. Machines of the second kind have fewer simultaneous frequency components, but in the course of operation, the forces are swept through a range of frequencies. Real machines may have both kinds of magnetic forces. To suppress the resonant amplification of the magnetic noise (vibration) in those cases, it is important to avoid coincidence between regions of the electromagnetic structure having large values of receptance at the natural frequency and the magnetic forces at the same frequency.

Figure 2:
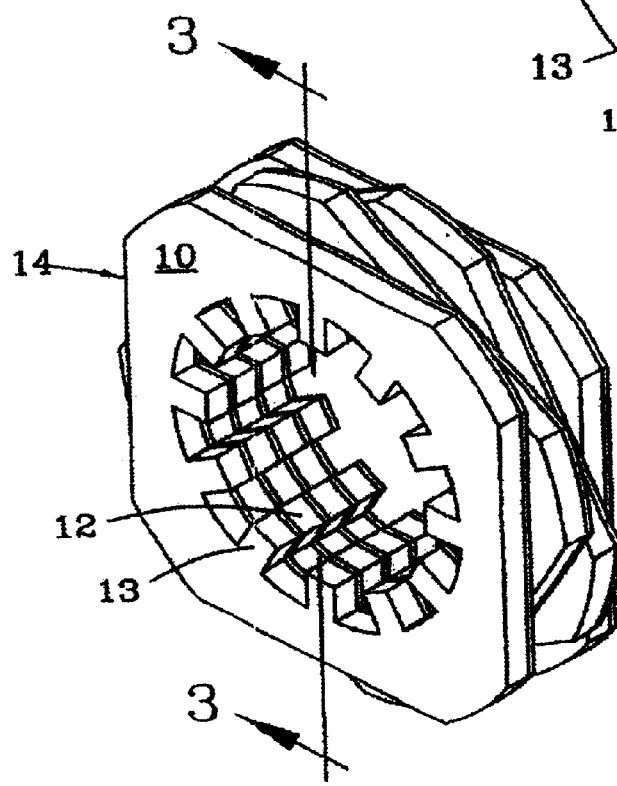
FIG. 2 is a stack of the laminations in FIG. 1 arranged to provide receptance differences along a tooth from lamination to lamination.
Figure 4:
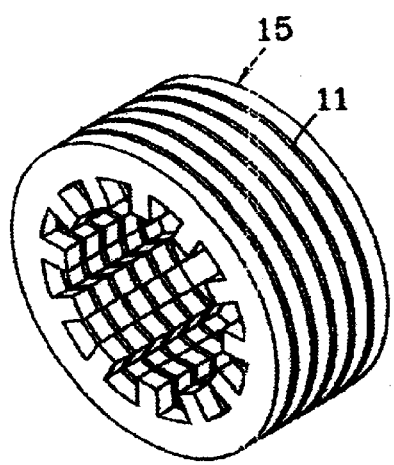
FIG. 4 illustrates a stack of circular stator laminations with damping material disposed at the lamination interfaces.
Figure 5:
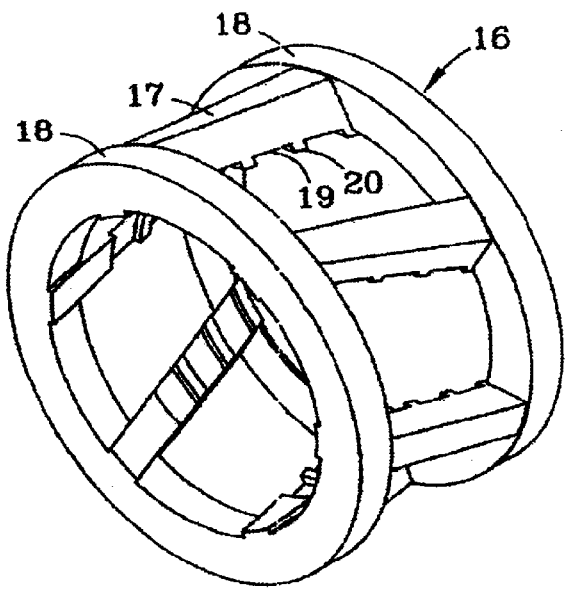
FIG. 5 is a frame with skewed support bars that have interrupted contact surfaces for the circular laminations.
Figure 6:
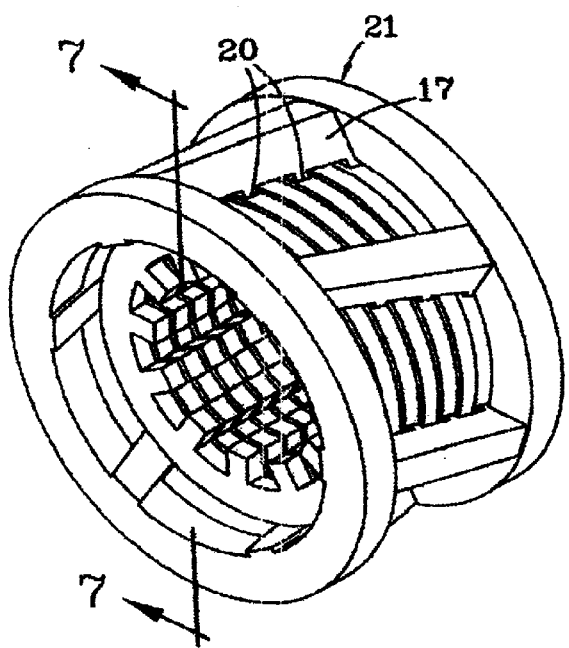
FIG. 6 illustrates the lamination stack in FIG. 4 after assembly in the FIG. 5 frame.

When an electromagnetic structure is found to have significant coincidence between the magnetic force frequencies and the natural frequencies and the magnetic forces are applied to regions of the electromagnetic structure having relatively large receptances, the structure can be modified to alter the receptance distribution. Structural modification of the laminations existing in the electromagnetic structure of said machine provides an effective means to alter the receptance field (mode shape). For example, mechanical features can be physically attached to the individual laminations or lamination stacks, or the lamination profile can be changed, including some combination of such modified electromagnetic structure. FIG. 1 shows a lamination with non-uniform radial receptance at the teeth. This type of lamination can be arranged in packets or stacks to modify the receptance distribution along a tooth from lamination to lamination. FIG. 2 illustrates a stack of laminations with a variation of receptance along its teeth from lamination to lamination. Attachment of mechanical features to said stator laminations can also take various known forms, such as welding, brazing, bonding, clamping, bolting, riveting or staking to alter the overall mass distribution and elastic distribution of the electromagnetic structure. A separate mechanical component configured to influence the receptance distribution of the electromagnetic structure when tightly fitted, or otherwise attached thereto, would also constitute modifying the mechanical features in accordance with the present method. FIG. 4 shows a stack of circular stator laminations that are essentially identical. FIG. 5 illustrates a stator frame with six skewed bars and two end rings. The bars have interrupted inner surfaces. FIG. 6 shows the assembly of the stack of laminations within the stator frame. The purpose of the interrupted inner surfaces of the bars is to directly connect some laminations to the frame while adjacent laminations are not connected. The bars are skewed to skew the receptances of laminations that are in contact with the frame.

Figure 3:
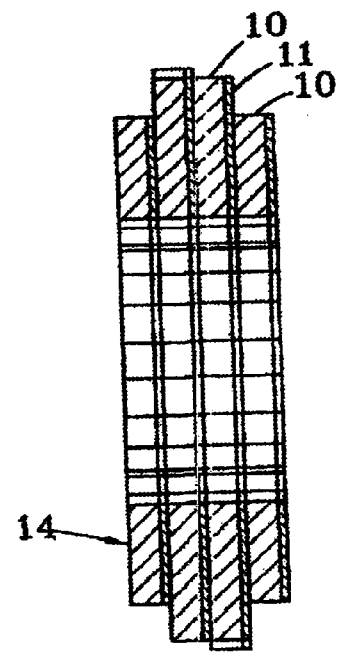
FIG. 3 shows a cross section of the lamination stack in FIG. 2 with damping material interposed between laminations.
Figure 7:
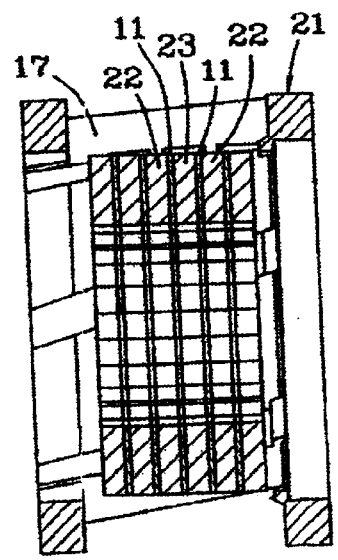
FIG. 7 is a cross section of the FIG. 6 assembly.

Mechanical damping is the conversion of mechanical energy to heat and serves to limit the amplitude of vibration in order to further suppress magnetic noise. Ordinarily, electromagnetic structures are considered lightly damped because the major source of damping is material damping. When an electromagnetic structure has been modified so that the receptances vary along a line of magnetic force that is acting on the structure at a frequency nearly coincident with a natural frequency of the structure, the potential for slip damping is created. This can be made to occur by providing adjacent laminations with different receptances in order to have different vibration levels when subjected to magnetic forces with equal magnitudes and frequencies. Material at the interface between the laminations can be worked in shear providing increased levels of damping. Adjacent laminations with large differences in their receptances will have large values of potential slip damping. FIG. 1 shows a stator lamination with damping material 11 applied to one of the surfaces. FIG. 2 illustrates a packet of stator laminations arranged to provide variation in receptance between adjacent teeth thus enabling slip potential to develop therebetween. FIG. 3 shows the damping material 11 provided at the interface between laminations to dissipate the vibration energy when relative motion occurs between laminations. FIG. 4 shows a stack of laminations with layers of damping material 11 disposed between laminations. FIG. 5 illustrates a stator frame that has been designed to contain the lamination stack shown in FIG. 4 to modify the overall receptance as well as provide slip potential. FIG. 6 shows that by virtue of the lands of the interrupted bar surfaces physically contacting the alternate laminations, the receptance of those laminations is modified. Adjacent laminations therefore have receptance differences that result in slip potential allowing the damping material to dissipate energy due to relative motion taking place between adjacent laminations. FIG. 7 is a cross section view for assembly of the stack and frame in FIGS. 4–6 showing the lands of the bars contacting alternate laminations.

A non-magnetic lamination placed in a position adjacent to a magnetic lamination having a large value of receptance at a particular location creates a site for substantial potential slip damping because the magnetic force does not directly act upon such non-magnetic lamination.

The magnetic noise produced by an operating dynamoelectric machine is not necessarily intrinsic to the machine itself. Dynamoelectric machines often operate in conjunction with a controller, thus constituting a system. The purpose of a controller is to regulate certain performance characteristics of the machine, such as, speed, rate of acceleration and torque. The design characteristics of a controller will determine the waveforms of the electrical power supplied to the dynamoelectric machine. The waveforms of the magnetic forces that produce operating noise in such dynamoelectric machine depend on the waveforms of the electrical power supplied by the controller to the machine. The waveform of the magnetic force determines the frequency content of the magnetic force. Therefore, the particular controller used in the machine-controller system influences the magnetic noise produced by the machine.

Design strategies have been developed for controllers intended to suppress magnetic noise of dynamoelectric machines. The tradeoffs made in the design of controllers to suppress magnetic noise often detract from other aspects of performance for the system, such as efficiency and power density. The present dynamoelectric machine design method as described above permits controller designers to focus on maximizing the overall performance of the system rather than managing waveforms to suppress noise of a machine. The present design method also leads to a universally compatible dynamoelectric machine for machine-controller systems exhibiting suppressed magnetic noise levels.

The present dynamoelectric machine design method can further be applied to the design of machines without regard to the frequency content of the magnetic forces caused by a controller. There are but two requirements to be followed in accordance with the present invention. The first is avoidance of significant coincidence between the maximum receptances and magnetic forces. The second is utilization of slip damping potential, which will suppress magnetic noise despite the harmonic content of the magnetic forces. Machines designed according to the present invention will experience suppression of magnetic noise when a frequency of the magnetic force component is nearly coincident with a natural frequency of the electromagnetic structure.

Adjustable speed drives are an example of systems that can benefit from the use of machines that have been designed according to the present invention. Two types of adjustable speed drives that are receiving much attention today are (1) inverter-fed squirrel-cage induction motors and (2) switched reluctance motors and controllers.

Centrifugal pumps and fans driven by electric motors are said to account for nearly twenty percent of the world's electrical energy demand. Large savings could be achieved if the speed of the motor could be matched to the flow requirement, rather than throttling the flow when full flow is not required. An adjustable speed system made up of a squirrel-cage induction motor and an adjustable frequency controller are often considered for these situations. In the past, these systems had the tendency to produce excessive magnetic noise.

The evolution of power electronic devices and the controller design strategies have allowed the designers to create adjustable frequency electrical power waveforms with reduced magnetic force harmonics, so modern controllers tend to produce less magnetic noise. It is, however, the nature of squirrel-cage induction motors, because of the slots in the rotor and stator, to produce harmonic magnetic forces even when the power supplied to the motor is optimal. The magnitude, spatial distribution and frequency of the harmonic magnetic forces, called slot harmonics, are determined by the electrical design of the motor. The frequencies of the slot harmonics change when the controller changes the frequency of the electrical power supplied to the motor to change the motor speed. In an ordinary motor design, excessive magnetic noise may be produced at speeds where a slot harmonic frequency is nearly coincident with a natural frequency of the electromagnetic structure. These kinds of systems would benefit from the use of the present dynamoelectric machine modification.

There has been a growing interest in switched reluctance motors in the past two decades. This interest stems from the robustness of the design and the potential low costs compared to alternative motor designs. Switched reluctance motors require a controller to operate. The controllers deliver electrical power to the machine in pulses causing pulsed magnetic forces to act on the machine. Therefore, there is a common tendency to characterize switched reluctance motors as magnetically noisy. A force pulse can be thought of as a set of force components each with a different frequency. Each force frequency component has the potential to excite a natural frequency of the electromagnetic structure. Strategies have been proposed for shaping of the applied magnetic pulses to suppress magnetic noise, but overall performance of the system is often adversely affected thereby. Such systems would also benefit from the use of the present dynamoelectric machine modification.

To illustrate how the present machine modification can be applied to dynamoelectric machine-controller systems, three representative examples of switched reluctance stator designs are presented. In the interest of simplifying further explanation, some construction details such as the electrical windings are not shown on the drawings.

The first example involves switched reluctance stator construction. The overall objective in this redesign is to utilize a lamination profile that has non-uniform radial receptances at the teeth. When the laminations are combined in a stack they are oriented so adjacent teeth have different receptances thus reducing the overall receptance of the stack as well as providing slip potential. Damping material is provided between the laminations to achieve slip damping.

FIG. 1 shows a steel stator lamination 10 with a layer of damping material 11. The radial receptance at stator tooth 12 is different from the radial receptance at stator tooth 13.

Shown in FIG. 2 is a stack 14 of laminations that have been arranged to place teeth 12 and 13 having different receptances adjacent to one another. The dynamic responses of these teeth to the pulsing radial magnetic forces will therefore be different. This arrangement reduces the overall receptance to magnetic forces acting on the teeth as well as provide slip potential.

The cross section in FIG. 3 of stack 14 shows the damping material 11 interposed between the laminations 10. The dynamic response differences at the teeth cause the damping material to be worked in shear, thus attenuating vibration and magnetic noise.

The second example involves switched reluctance stator and frame modification. The object in this example is to provide a frame with certain features that will reduce the overall receptance of the frame and stack assembly as well as provide slip potential.

FIG. 4 shows a stack of laminations 15 with layers of damping material 11 disposed between adjacent laminations.

FIG. 5 illustrates a cylindrical stator frame 16 constructed of six bars 17 and two end rings 18. The bars 17 are skewed relative to the axis of the cylindrical frame 16. The inside surfaces of the bars 17 are configured in a series of circumferential groves 19 and lands 20.

FIG. 6 shows the stator assembly 21 of the stack of laminations 15 in FIG. 4 with frame 16 in FIG. 5. The outside diameter of the stack of laminations 15 and the inside diameter of the frame 16 at the lands 20 of the bars 17 have been selected to provide an interference fit at those locations. The lands 20 engage alternate laminations of the stack 15. The receptance of the laminations engaged by the lands 20 is different from laminations in line with the grooves 19 in FIG. 5, thus providing slip potential. The skewed bars 17 skew the receptances of those laminations engaged by the bars 17 at the lands 20, thus reducing the overall receptance of the stator assembly 21.

FIG. 7 is a cross section of the stator assembly 21 in FIG. 6 showing the damping material 11 disposed between the engaged laminations 22 and the unengaged laminations 23. The damping material 11 is placed between the laminations to dissipate vibrational energy of the stack of laminations 15 in FIG. 4 to attenuate the noise.

The third example involves switched reluctance stator modification. The object in this example is to use two different kinds of laminations in the stack to achieve a reduction in the overall receptance, together with providing slip potential and slip damping therein.

Figure 8:
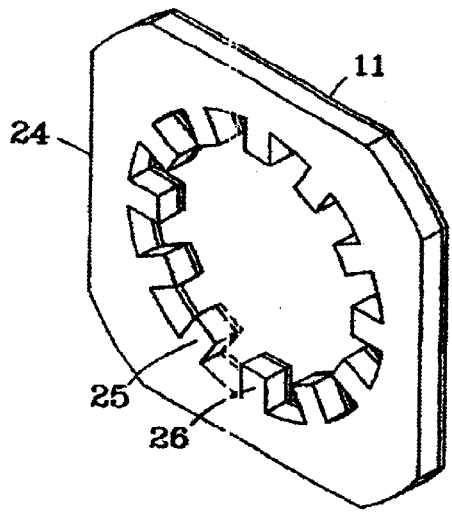
FIG. 8 illustrates another steel lamination with non-uniform radial receptance at the teeth.

FIG. 8 shows a stator lamination 24 backed with a layer, of damping material 11. The radial receptance of stator tooth 25 is different than the radial receptance at stator tooth 26.

Figure 9:
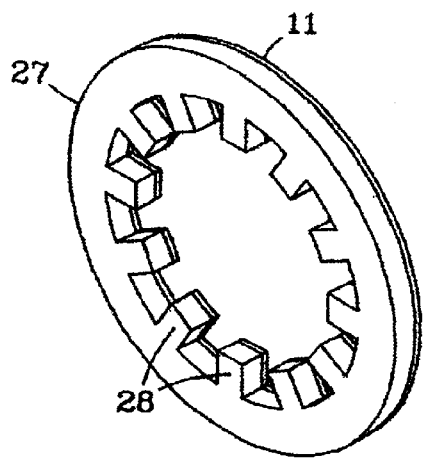
FIG. 9 shows a circular steel lamination with uniform radial receptance at the teeth.

FIG. 9 shows a circular stator lamination 27 backed with a layer of damping material 11. The radial receptance of the stator teeth 28 is different from the radial receptances of the teeth 25 and 26 in FIG. 8.

Figure 10:
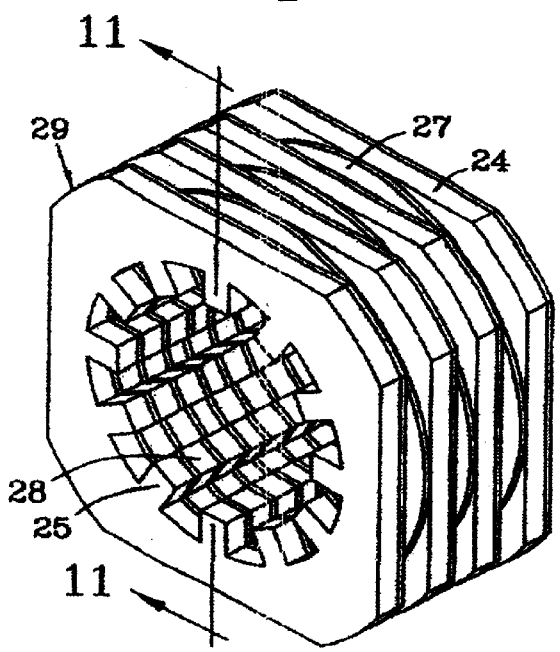
FIG. 10 illustrates a stack of laminations with alternating types of laminations to provide receptance differences along a tooth from lamination to lamination.

FIG. 10 shows a stack of stator laminations 29 comprised of laminations 24 alternating with laminations 27. Slip potential exists between said laminations by reason of the variation of radial receptances in adjacent teeth. When a pulsing radial magnetic force acts on a row of teeth 25 alternating with teeth 28 the dynamic responses of the teeth will be different.

Figure 11:
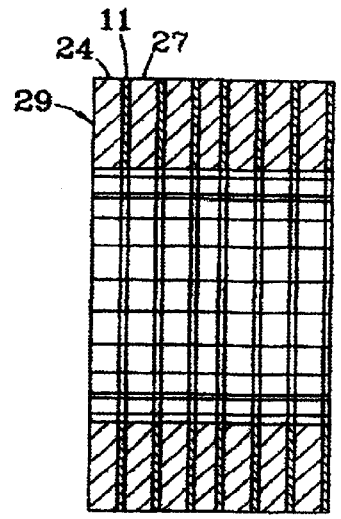
FIG. 11 shows a cross section for a stack of laminations having damping material disposed between adjacent laminations.

FIG. 11 is a cross section of stator laminations 29 showing the layer of damping material 11 interposed between the laminations 24 and the laminations 27. The damping material will be worked in shear because of the difference in the dynamic responses of laminations 24 and laminations 27. The resulting slip damping will dissipate vibration thereby attenuating the magnetic noise.

It will be apparent from the foregoing description, that while preferred embodiments of the present invention have been herein described, that still other embodiments of the present modified dynamoelectric machine construction are also contemplated. For example, the method of the present invention can be carried out by those skilled in the art employing newly developed computer programs. Likewise, the structural modifications for a particular dynamoelectric machine in accordance with the present invention can be further dictated by its intended end use. Consequently, it is intended to cover all variations in the disclosed method and machine construction which may be devised by persons skilled in the art as falling within the true spirit and scope of the herein claimed invention.

What I claim as new and desire to secure by Letters Patent of the United States is:

1. A method to reduce vibration and noise during operation of a dynamoelectric machine comprising the steps of:
   (a) determine the overall receptance for the electromagnetic structure in said machine at natural frequencies to the magnetic force being applied at said natural frequencies during machine operation,
   (b) modify the mechanical features of said electromagnetic structure to reduce the overall receptance of said modified electromagnetic structure to said applied magnetic force,
   (c) further modify adjacent stator laminations in said electromagnetic structure to provide slip damping therebetween due to having dissimilar receptance.

2. The method of claim 1 wherein the natural frequencies and corresponding mode shapes of the electromagnetic structure are determined by mathematical calculation.

3. The method of claim 1 wherein the natural frequencies and corresponding mode shapes of the electromagnetic structure are determined by experimental evaluation.

4. The method of claim 1 wherein the spatial distribution of the magnetic force acting on the electromagnetic structure is determined by mathematical calculation.

5. The method of claim 1 wherein the time waveform of the magnetic force acting upon receptance sites in the electromagnetic structure is determined by mathematical calculation.

6. The method of claim 5 wherein the corresponding magnetic force frequency spectrum is determined by mathematical calculation.

7. The method of claim 1 wherein the spatial distribution of the magnetic force acting on the electromagnetic structure is determined by experimental evaluation.

8. The method of claim 1 wherein the time waveform of the magnetic force acting upon receptance sites in the electromagnetic structure is determined by experimental evaluation.

9. The method of claim 8 wherein the corresponding magnetic force frequency spectrum is determined by experimental evaluation.

10. The method of claim 2 performed by mathematical modeling calculation.

11. The method of claim 4 performed by mathematical modeling calculation.

12. The method of claim 5 performed by mathematical modeling calculation.

13. The method of claim 6 performed by mathematical modeling calculation.

14. The method of claim 1 wherein the amount of vibration noise during machine operation depends upon the spatial distribution of the applied magnetic forces structural receptances of the electromagnetic structure and the proximity of coincidence between the magnetic force frequencies and the natural frequencies of the electromagnetic structure.

15. The method of claim 1 wherein receptance of the electromagnetic structure is its vibrating response at a natural frequency to the magnetic force being applied at the same frequency for specific physical sites in said electromagnetic structure.

16. The method of claim 15 wherein the receptance of said electromagnetic structure corresponds to the mode shape of the structure at that natural frequency.

17. The method of claim 2 wherein the mode shape is a graphical representation of relative amplitudes of vibration for the electromagnetic structure at a particular natural frequency.

18. The method of claim 1 wherein the maximum receptance sites in the electromagnetic structure at a natural frequency are the antinode sites of the corresponding mode shape.

19. The method of claim 1 wherein the minimum receptance sites in the electromagnetic structure at a natural frequency are the node sites of the corresponding mode shape.

20. The method of claim 1 wherein maximum vibration of the electromagnetic structure occurs when the frequency of the magnetic force coincides with a natural frequency of the electromagnetic structure and the spatial distribution of the magnetic force coincides with the maximum receptance sites in the electromagnetic structure at that natural frequency.

21. The method of claim 1 wherein said dynamoelectric machine is an electric motor.

22. The method of claim 1 wherein said dynamoelectric machine is an electric generator.

23. The method of claim 1 wherein modifying structural features in said electromagnetic structure includes modification of the stator physical dimensions.

24. The method of claim 1 wherein modifying structural features in said electromagnetic structure includes modified stator slots.

25. The method of claim 1 wherein modifying the structural features in said electromagnetic structure includes modified stator poles.

26. The method of claim 1 wherein modifying the structural features in said electromagnetic structure includes modified stator teeth.

27. The method of claim 1 wherein modifying structural features in said electromagnetic structure includes a modified stator core.

28. The method of claim 1 wherein modifying structural features in said electromagnetic structure further includes modification of the machine rotor.

29. The method of claim 28 wherein modification of said structural features includes modifying the operative cooperation between the stator and rotor.

30. Vibration noise suppression means for dynamoelectric machine operation which comprises a mechanically modified electromagnetic structure reducing the overall receptance of said modified electromagnetic structure to the applied magnetic force in operative association with adjacent laminations in said electromagnetic structure having slip damping therebetween.

31. Vibration noise suppression means of claim 30 wherein mechanical modification of the electromagnetic structure is made dependent upon the spatial distribution of the applied magnetic force, the structural receptances of the electromagnetic structure and the proximity of ocincidence between the magnetic force frequencies and the natural frequencies of the electromagnetic structure.

32. Vibration noise suppression means of claim 30 wherein mechanical modification of the electromagnetic structure is made dependent upon receptance of the electromagnetic structure at a natural frequency to the magnetic force being applied at the same frequency.

33. Vibration noise suppression means of claim 32 wherein receptance of said electromagnetic structure corresponds to the mode shape of the structure at that natural frequency.

34. Vibration noise suppression means of claim 33 wherein the mode shape is a graphical representation of relative amplitudes of vibration for the electromagnetic magnetic structure at a particular natural frequency.

35. Vibration noise suppression means of claim 32 wherein the maximum receptance sites in the electromagnetic structure at a natural frequency are the antinode sites of the corresponding mode shape.

36. Vibration noise suppression means of claim 32 wherein the minimum receptance sites in the electromagnetic structure at a natural frequency are the node sites of the corresponding mode shape.

37. Vibration noise suppression means of claim 30 wherein said dynamoelectric machine is an electric motor.

38. Vibratory noise suppression means of claim 30 wherein said dynamoelectric machine is an electric generator.

39. Vibratory noise suppression means of claim 30 wherein modifying structural features in said electromagnetic structure includes modification of the physical dimensions.

40. Vibratory noise suppression means of claim 30 wherein modifying structural features in said electromagnetic structure includes modified slots.

41. Vibratory noise suppression means of claim 30 wherein modifying the structural features in said electromagnetic structure includes modified teeth.

42. Vibratory noise suppression means of claim 30 wherein modifying the structural features in said electromagnetic structure includes modified poles.

43. Vibratory noise suppression means of claim 30 wherein Modifying structural features in said electromagnetic structure includes a modified core.

44. Vibratory noise suppression means of claim 30 wherein modifying structural features in said electromagnetic structure includes modification of the machine stator.

45. Vibratory noise suppression means of claim 30 wherein modification of said structural features includes modifying the operative cooperation between the stator and rotor.

46. A dynamoelectric machine exhibiting reduced vibratory noise which includes a rotor and stator component having relative motion therebetween during operations said stator component including an electromagnetic structure which is mechanically modified to reduce the overall receptance to the magnetic force being applied during machine operation while further being modified with slip damping means being disposed between adjacent laminations.

47. A dynamoelectric machine exhibiting reduced vibratory noise which comprises:
  (a) a stator mounted in a stationary housing having a bore therethrough which includes a mechanically modified electromagnetic structure having a laminated ferromagnetic core ring containing a plurality of poles disposed therein upon teeth elements spaced apart in slot openings, said electromagnetic structure having been mechanically modified to reduce the overall receptance of said modified electromagnetic structure to the magnetic force being applied during machine operation while further being modified with slip damping means being disposed between adjacent stator laminations, and
  (b) a rotor being movably mounted with respect to said stator.

48. The dynamoelectric machine of claim 47 wherein mechanical modification of the electromagnetic structure is made dependent upon the spatial distribution of the applied magnetic force, the structural receptances of the electromagnetic structure and the proximity of coincidence between the magnetic force frequencies and the natural frequencies of the electromagnetic structure.

49. The dynamoelectric machine of claim 47 wherein mechanical modification of the electromagnetic structure is made dependent upon receptance of the electromagnetic structure at a natural frequency in response to the magnetic force being applied at nearly the same frequency.

50. The dynamoelectric machine of claim 49 wherein receptance of said electromagnetic structure corresponds to the mode shape of the structure at that natural frequency.

51. The dynamoelectric machine of claim 49 wherein the mode shape is a graphical representation of relative amplitudes of vibration for the electromagnetic structure at a particular natural frequency.

52. The dynamoelectric machine of claim 50 wherein the maximum receptance sites in the electromagnetic structure at a natural frequency are the antinode sites of the corresponding mode shape.

53. The dynamoelectric machine of claim 49 wherein the minimum receptance sites in the electromagnetic structure at a natural frequency are the node sites of the corresponding mode shape.

54. The dynamoelectric machine of claim 47 wherein said dynamoelectric machine is an electric motor.

55. The dynamoelectric machine of claim 47 wherein said dynamoelectric machine is an electric generator.

56. The dynamoelectric machine of claim 47 wherein modifying structural features in said electromagnetic structure includes modification of the stator physical dimensions.

57. The dynamoelectric machine of claim 47 wherein modifying structural features in said electromagnetic structure includes modified stator slots.

58. The dynamoelectric machine of claim 47 wherein modifying the structural features in said electromagnetic structure includes modified stator poles.

59. The dynamoelectric machine of claim 47 wherein modifying the structural features in said electromagnetic structure includes modified stator teeth.

60. The dynamoelectric machine of claim 47, wherein modifying the structural features in said electromagnetic structure includes a modified stator core.

61. The dynamoelectric machine of claim 47 wherein modifying structural features in said electromagnetic structure further includes modification of the machine rotor.

62. The dynamoelectric machine of claim 47 wherein modification of said structural features includes modifying the operative cooperation between the stator and rotor.

* * * * *